3,295,907
FOOD CABINET CLOSURE
Thomas M. Galvin, Quincy, Mass., assignor to Interstate Fabrications, Inc., Boston, Mass., a corporation of Massachusetts
Filed Feb. 9, 1965, Ser. No. 431,266
4 Claims. (Cl. 312—298)

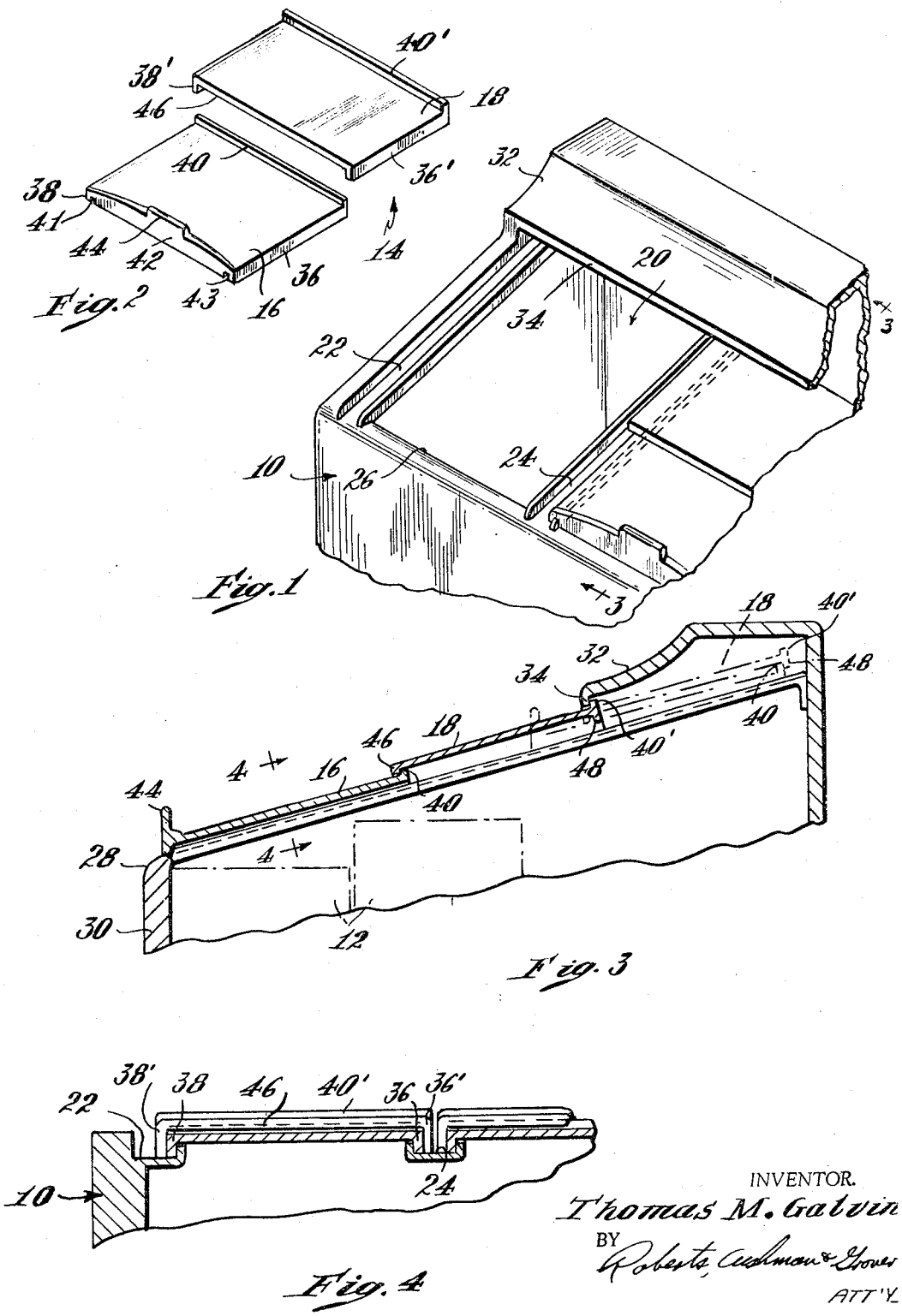

This invention relates to food cabinets and the like and has for its principal object provision of an improved closure which is effective, sanitary and inexpensive to manufacture.

For the retail dispensing of food such as ice cream or the like, a container or cabinet for bulk quantities is provided which has a top opening and a cover therefor which is removable to provide access to the contents. In the dispensing of such food, it is of importance to provide a cover and closure arrangement which will effectively prevent drippings or other foreign objects which may fall on the cover when closed from gaining access to the food chamber to contaminate the contents thereof as the cover is opened and closed in use.

In accordance with the present invention, the improved closure comprises the combination of a novel cover with a food cabinet having a rearwardly inclined top opening defined by front, rear and two side edges, the side edges being defined by channel members, and the rear edge being covered by an overhanging cabinet member terminating in a depending lip over said opening.

The improved cover comprises a plurality of front to rear telescoping sections, all sections having sides terminating in depending edges adapted to fit slidably within said channels and having upstanding rear edges, the front section having an upstanding forward edge and the remaining sections having depending forward edges adapted to fit over and engage the upstanding rearward edge of adjacent sections when closed, said remaining sections having rear edge depending portions adapted to be engaged by the upstanding rear edges of adjacent sections when opened, the upstanding rear edge of the rearwardmost section being adapted to engage the rear surface of the depending lip of said overhanging member. Preferably, all sections have smooth top surfaces devoid of obstructions or depressions crosswise from channel to channel. Preferably, the upstanding forward edge of the forward cover section carries an upstanding handle by which the operator may actuate the cover sections to open or close them. This handle is preferably integral and does not have any holes, openings, screws or the like to present a cleaning problem.

For the purpose of illustration, a preferred embodiment of the present invention is shown in the accompanying drawing wherein:

FIG. 1 is an isometric view, with parts broken away, showing the top of the cabinet;

FIG. 2 is an exploded isometric view showing a cover having two telescoping sections;

FIG. 3 is a section on the line of 3—3 of FIG. 1; and

FIG. 4 is a section on the line 4—4 of FIG. 3.

Referring to the drawings, the embodiment illustrated comprises a cabinet 10 for bulk containers 12 for ice cream or the like of the type often employed in fountains, and a cover 14 containing forward section 16 and rearward section 18.

The cabinet 10 has a top opening 20 having sides defined by channels 22 and 24, a smooth forward edge 26 which merges smoothly over radius 28 with the front face 30 of cabinet 10, and a rear edge covered by overhanging member 32 which terminates in a downward depending lip 34. As shown in FIG. 3, the top of the cabinet and the opening therein is rearwardly inclined so that any liquids within channels 22 or 24 will flow downwardly by gravity, over the edge of radius 28 to the front 30 of cabinet 10.

As illustrated, cover 14 comprises two sections, front section 16 and rear section 18. Both sections 16 and 18 have depending side edges 36 and 38 adapted to fit slidably within channels 22 and 24, and upstanding rear edges 40. Front section 16 has front edge 42 which is provided with slots 41 and 43 for receiving the inner upstanding flanges of channels 22 and 24. Upstanding handle 44 is integrally formed in upstanding edge 42.

Rear section 18 has depending front edge 46 which is adapted to fit over and engage rear edge 40 of front section 16 when the two sections are closed as shown in FIG. 3. Rear edge 40 of section 18 fits behind and engages the rear surface of depending lip 34 of overhanging member 32 which constitutes a stop limiting the forward movement of rear section 18 when the cover is closed. Front edge 46 similarly serves as a stop limiting the forward movement of telescoping front section 16. Rearward section 18 also has at its rear edge depending portion 48 which serves as a stop for upstanding edge 40 of front section 16 when the cover is open as shown in broken lines in FIG. 3. Rearward movement of the sections is limited either by engagement of the rear edges of the sections against the rear portion of the cabinet 10 or by engagement of handle 44 and edge 42 with the front of depending lip 34, depending on the cover dimensions. Alternatively, the extent of opening of the telescoping sections can be limited as desired by insertion of suitably spaced stops (not shown) in the upper portion of the channel members 22 and 24.

The cabinet closure construction can be repeated for as many food compartments as desired. Two such parallel units are herein illustrated but it will be apparent that a single closure or more than two can be employed as desired. Also, while the telescoping cover is herein illustrated as comprising two sections, one front and one rear, it will be further apparent that additional intermediate sections can be employed as desired. Such additional intermediate sections would be identical with rear section 18.

It is a major advantage of the present invention that compartments may be opened and closed without interfering with access to adjacent compartments as was sometimes the case with prior closures. Also the present construction is spillproof with self-draining side channels and complies with the standards of the National Sanitation Foundation Testing Laboratory standards and has been approved. When the covers are closed, spilled waste on the surface thereof can run freely to the side channels or downwardly to lip 42 and thence into the channels. The channels are inclined and unobstructed so that waste may flow freely or be easily cleaned.

The cover sections are easily removed by tilting the forward edge 46 of rear section 18 upwardly until rear edges 40 and 48 clear obliquely the space under depending lip 34. Front section 16 may then be lifted. The above procedure is reversed for installation, the front section is placed in a semi-open position and the rear section tilted and inserted under depending lip 34 and the forward edge 46 thereof rotated downwardly until it engages the surface of front section 16 and side guide channels 22 and 24.

The cover sections may be made of any suitable material but are preferred molded from plastic material having good thermal insulation properties. Vacuum forming is a convenient and inexpensive forming method.

It should be understood that the foregoing description is for the purpose of illustration and that the invention includes all modifications within the scope of the appended claims.

I claim:

1. In combination with a food cabinet having a rearwardly inclined top opening defined by front, rear and two side edges, the front edge merging smoothly with the front of the cabinet, the side edges having linear, rearwardly-inclined channels with the open side up disposed adjacent thereto and the rear edge being covered by an overhanging member terminating in a depending lip; a cover for said opening comprising a plurality of front to rear telescoping sections, all sections having depending side edges adapted to fit slidably within said side channels, all sections having upstanding rear edges, the front section having an upstanding forward edge and the remaining sections having depending forward edges adapted to fit over and engage the upstanding rearward edges of adjacent sections when closed, said remaining sections having rear edge depending portions adapted to be engaged by the upstanding rear edges of adjacent sections when opened, the upstanding rear edge of the rearwardmost section being adapted to engage the rear surface of the depending lip of said overhanging member, the surfaces of all of said sections being smooth from side to side so as to permit the free movement sidewise of spilled materials from the surface thereof.

2. A cover according to claim 1, further comprising a forward section having an integral upstanding handle for opening and closing the cover.

3. A cover according to claim 1, wherein all sections have substantially plane top surfaces intermediate said edges.

4. A food container comprising a cabinet having a rearwardly inclined top opening defined by front, rear and two side edges, the front edge merging smoothly with the front of the cabinet, the side edges having channels disposed adjacent thereto, and the rear edge being covered by an overhanging cabinet member terminating in a depending lip, and a cover therefor comprising front and rear telescoping sections, both sections having depending side edges adapted to fit slidably with said cabinet channels and upstanding rear edges, the front section having an upstanding front edge, the rear section having a depending front edge adapted to fit over and engage the upstanding rear edge of the front section, the rear section also having depending stops at its rear edge adapted to engage the upstanding rear edge of the front section when the cover is opened, the upstanding rear edge of the rear section being adapted to fit behind and abutt said overhanging lip when the cover is closed, both sections intermediate their front and rear edges being substantially smooth.

References Cited by the Examiner
UNITED STATES PATENTS 1,134,540   4/1915   Kress _____ 217—62

FOREIGN PATENTS 396,773   6/1924   Germany.

CLAUDE A. LE ROY, *Primary Examiner.*

F. DOMOTOR, *Assistant Examiner.*